United States Patent
Bourge et al.

(10) Patent No.: US 7,676,099 B2
(45) Date of Patent: Mar. 9, 2010

(54) METHOD OF DOWN-SAMPLING DATA VALUES

(75) Inventors: Arnaud Bourge, Paris (FR); Luis Ignacio Escobar Sanz, Madrid (ES)

(73) Assignee: NXP B.V., Eindhoven (NL)

( * ) Notice: Subject to any disclaimer, the term of this patent is extended or adjusted under 35 U.S.C. 154(b) by 803 days.

(21) Appl. No.: 11/587,028

(22) PCT Filed: Apr. 21, 2005

(86) PCT No.: PCT/IB2005/051313

§ 371 (c)(1),
(2), (4) Date: Oct. 20, 2006

(87) PCT Pub. No.: WO2005/104031

PCT Pub. Date: Nov. 3, 2005

(65) Prior Publication Data

US 2007/0206680 A1    Sep. 6, 2007

(30) Foreign Application Priority Data

Apr. 27, 2004 (EP) .................................. 04300232

(51) Int. Cl.
*G06K 9/36* (2006.01)
*G06T 3/40* (2006.01)
*G06K 9/46* (2006.01)

(52) U.S. Cl. ................... 382/232; 382/240; 375/240.21

(58) Field of Classification Search ................. 382/100, 382/164, 172, 173, 218–220, 232, 233, 236, 382/240, 251, 260–264, 276–277, 305; 375/232, 375/240.11, 240.16, 240.19, 240.21, 240.24, 375/240.25, 240.27; 348/584, 671
See application file for complete search history.

(56) References Cited

U.S. PATENT DOCUMENTS

| | | | | |
|---|---|---|---|---|
| 5,640,212 A * | 6/1997 | Baccarini | .................... | 348/671 |
| 5,822,463 A * | 10/1998 | Yokose et al. | ............... | 382/251 |
| 5,953,076 A * | 9/1999 | Astle et al. | .................. | 348/584 |
| 6,580,837 B1 * | 6/2003 | Johnson | ..................... | 382/300 |
| 2003/0185292 A1 * | 10/2003 | Fernandez-Corbaton et al. | .......................... | 375/232 |
| 2005/0129130 A1 * | 6/2005 | Shen et al. | ............. | 375/240.24 |
| 2006/0147127 A1 * | 7/2006 | Slavin | ........................ | 382/298 |
| 2007/0206680 A1 * | 9/2007 | Bourge et al. | .......... | 375/240.21 |

OTHER PUBLICATIONS

Jaspers E G T et al: "A Generic 2D Sharpness Enhancement Algorithm for Luminance Signals"; International Conference on Image Processing and Its Applications, London GB; vol. 4, Jul. 14, 1997; pp. 269-273.

* cited by examiner

*Primary Examiner*—Amir Alavi

(57) ABSTRACT

The present invention relates to a method of down-sampling data values. A first set of data values comprise a central data value and peripheral values of original data spatially surrounding the central data value. The central and peripheral values are compared to determine whether any differences exceed a threshold. Whenever a difference does exceed a threshold, a clipped value based upon the central data value replaces the corresponding peripheral value, thereby producing a second set of data values.

10 Claims, 6 Drawing Sheets

METHOD OF DOWN-SAMPLING DATA VALUES

This application is a 371 of PCT/IB05/51313 filed on Apr. 21, 2005.

FIELD OF THE INVENTION

The present invention relates to a method of and a device for down-sampling data values.

This invention may be applied to still pictures or to sequences of pictures. It may be used in, for example, video encoders, video decoders, or portable apparatuses, such as personal digital assistants or mobile phones, said apparatuses being adapted to encode or to decode pictures, to store or to display pictures at a lower spatial resolution.

BACKGROUND OF THE INVENTION

In video and still pictures processing, down-sampling and up-sampling techniques are widely used either to adapt the content of a picture to the spatial resolution of the display or to pre-process a sequence of pictures before the encoding step in order to achieve a given bit-rate. The down-sampling and up-sampling filters conventionally used are linear low-pass filters.

The combination of the known down-sampling and up-sampling linear filters leads to blurry images because high frequencies are attenuated by said filters. Additional techniques can be introduced in order to enhance or to create high frequencies so as to improve edges. But image enhancement techniques that are conventionally used after the up-sampling filter, namely they correspond to post-processing techniques, are often complex.

An example of such a post-processing technique called peaking is described in the paper entitled "A generic 2D Sharpness Enhancement Algorithm for Luminance Signals", by E. G. T. Jaspers and P. H. N. de With, Sixth International Conference on Image Processing and Its Applications, 1997, Volume: 1, pp. 269-273, 14-17 Jul. 1997. Roughly speaking, peaking consists in enhancing high frequencies by adding to an up-sampled image the result of a high pass filtering of said up-sampled image multiplied by a weighting coefficient.

Furthermore, such processing techniques operate on the whole up-sampled image, and thus yield to many computations.

SUMMARY OF THE INVENTION

It is an object of the invention to propose a method of down-sampling data values which is less complex than the one of the prior art.

To this end, the down-sampling method in accordance with the invention is characterized in that it comprises the steps of:
  determining a first set of data values comprising an original current data value and values of original data spatially surrounding said current data;
  creating a second set of data values based on the first set by clipping an original data value of the first set when a difference between the current data value and said original data value is higher than a threshold; and
  low pass filtering the current data value based on the second set of data values.

Due to the introduction of the clipping process, the present invention proposes a non-linear method of down-sampling images, which yields to sharper down-sampled images and so to sharper up-sampled images. In other words, the down-sampling method directly sharpens the image and thus eliminates the need for a post-processing image enhancement technique. By using this down-sampling method, the complexity is reduced, as the sharpness enhancement operates on the down-sampled image and not on the up-sampled one as described in the prior art post-processing method. As it will be explained in more detail hereinafter, simple and low-cost operations are performed in the proposed solution.

Beneficially, the threshold is equal to 3 if the original data values lie in the range 0 to 255.

The present invention also relates to a device implementing such a down-sampling method. It relates to a display unit comprising such a device for down-sampling data values and a screen for displaying the down-sampled data values. It relates to a storage unit comprising such a device for down-sampling data values, a memory for storing the down-sampled data values and a device for up-sampling the down-sampled data values stored in the memory.

The invention also relates to a video decoder comprising a decoding unit for providing a residual error, such a storage unit in series with a motion compensation unit adapted to deliver motion compensated data values, and an adder for adding the residual error to the motion compensated data values, the output of said adder being provided to the input of the storage unit. Beneficially, wherein the storage unit further comprises an embedded encoding unit between the device for down-sampling and the memory, and an embedded decoding unit between the memory and the device for up-sampling.

The invention also relates to a video encoder or to a portable apparatus comprising such a device for down-sampling data values.

Said invention finally relates to a computer program product comprising program instructions for implementing said down-sampling method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
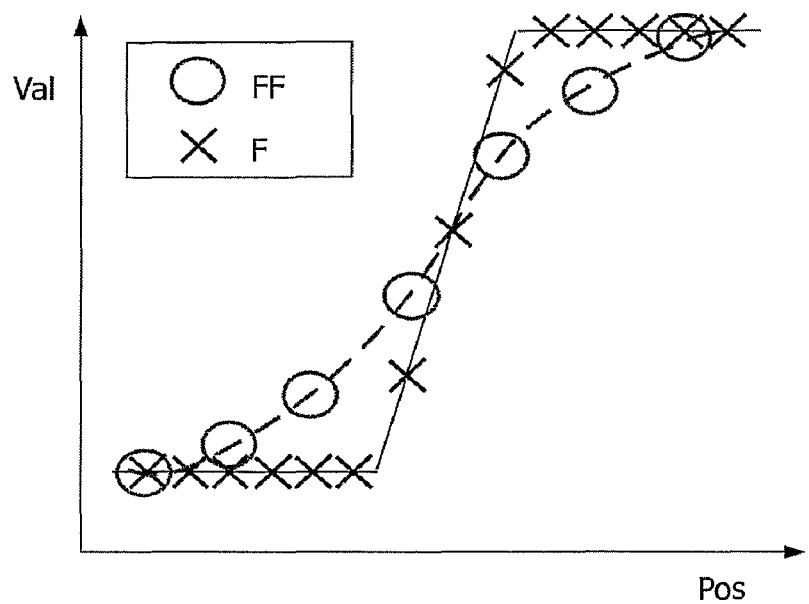
FIG. 1 illustrates the result of a conventional down-sampling method on a set of pixels surrounding an edge.

The present invention relates to a method of down-sampling data values included in a still picture or in a sequence of pictures. These data values are, for example, the luminance or the chrominance of pixels. A conventional down-sampling method usually comprises a linear filtering step, which makes transitions smooth due to the interpolation of the nearest corresponding values. This point is illustrated in FIG. 1 showing the evolution of the original and filtered data values val as a function of their position pos within a picture. In said FIG. 1, crosses represent the original data values F, circles represent the filtered data values FF and the dashed curve shows the smoothing effect of the linear filter. These linear filters are well known to introduce a blurring effect because they tend to suppress high frequency components of the data values.

To cope with this problem, the down-sampling method in accordance with the invention comprises a step of determining a set of data values comprising an original central pixel value and values of original pixel spatially surrounding said central pixel. This set of data values typically corresponds to the input values of a conventional linear filtering.

Figure 2A:
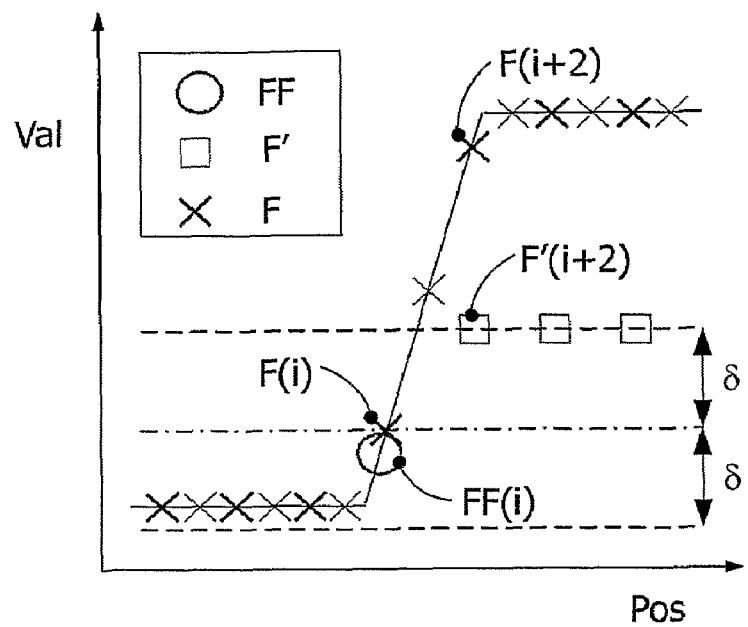
FIGS. 2A and 2B illustrates two consecutive clipping and filtering steps of a down-sampling method in accordance with the invention.
Figure 2B:
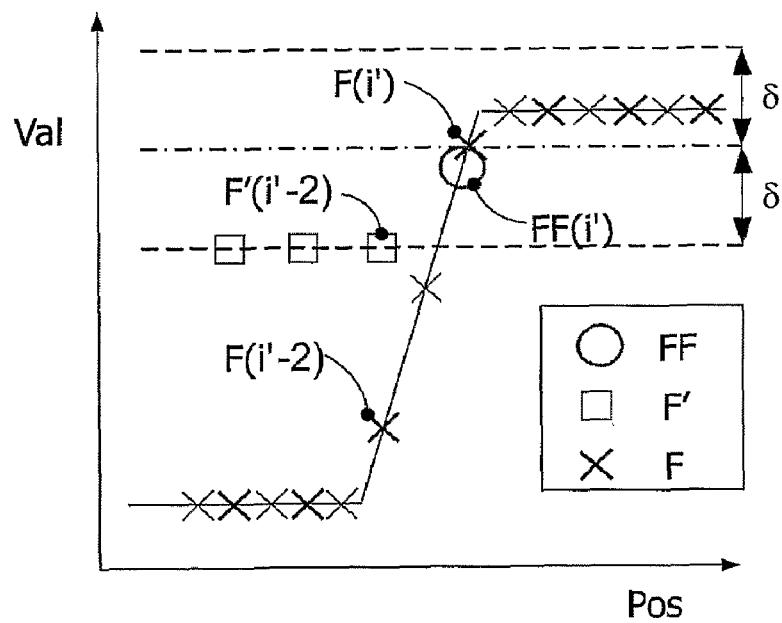

Said down-sampling method further comprises a step of modifying the original data values of the set in the transitions corresponding to edges. Basically, said modifying step comprises the two following sub-steps illustrated by FIGS. 2A and 2B. FIGS. 2A and 2B correspond to a down-sampling by a factor 2. However, it will be apparent to a person skilled in the art that the present invention is also applicable to any other down-sampling factor.

During a first sub-step a difference diff(k) between a central pixel original value F(i) and every pixel value F(i±k) used to create the down-sampled value FF(i) is computed as shown in equation (1):

$$\text{diff}(k) = |F(i) - F(i \pm k)| \quad (1)$$

where k is an integer equal to 1, 2 or 3 in the example a 7-tap filter.

During a second sub-step, the difference diff(k) is compared to a threshold $\delta$. If the difference diff(k) is lower than the threshold $\delta$ for a given value of k, the corresponding original pixel value F(i ±k) is kept unchanged. If the difference diff(k) is higher than the threshold $\delta$ for a given value of k, the corresponding original pixel value F(i±k) is replaced by a clipped value F'(i±k) in the calculation of the filtered data value FF(i), as shown in equation (2):

$$F'(i \pm k) = F(i) \pm \delta \quad (2)$$

The new down-sampled value is the result of a low-pass filtering of set of modified pixel values, said modified pixel values comprising the unchanged pixel values and the clipped pixel values depending on the result of the comparison sub-step. In the example of FIG. 2A, the set of modified values comprises F(i−6), F(i−4), F(i−2), F(i), F'(i+2), F'(i+4) and F'(i+6).

FIGS. 2A and 2B illustrate the modification of the original values for two consecutive pixel values to be filtered, using the down-sampling method in accordance with the invention. It is important to note that the modified values F'(i±k) are only used to create the current down-sampled value FF(i). For the next down-sampled value to be calculated FF(i')=FF(i+2), the original values are used again, as shown in FIG. 2B, and the modifying and low-pass filtering steps are applied again, as before.

The down-sampling method in accordance with the invention requires the use of the threshold $\delta$, which is a non-linear operation. This creates frequencies beyond the Nyquist barrier that will be fold back into the working bandwidth. The lower the threshold $\delta$ is, the more visible the aliasing signals are. Visual tests show that a good value for the threshold is $\delta=3$ for data values varying from 0 to 255, which is a good trade-off between aliasing (low $\delta$) and blurring (high $\delta$). As a consequence of said non-linear filtering, the reconstructed pictures sequences are sharper, which is visually pleasant.

After the clipping step, any linear filter can be used for the down-sampling and optionally up-sampling operations. According to an embodiment of the invention, the best trade-off between visual quality and computational complexity is, for down-sampling, the use of a 7-tap FIR (for Finite Impulse Response) filter with the following weights: $(-1/32, 0, 9/32, 16/32, 9/32, 0, -1/32)$; and for up-sampling, the use of a 6-tap FIR filter with the following weights: $(1/32, -5/32, 5/8, 5/8, -5/32, 1/32)$, said filters being the ones used for sub-pixel motion compensation in H.264 standard, as described in ITU-T Rec. H.264/ISO/IEC 11496-10, "Advanced Video Coding", Final Committee Draft, Document JVTF100, December 2002.

Figure 3:
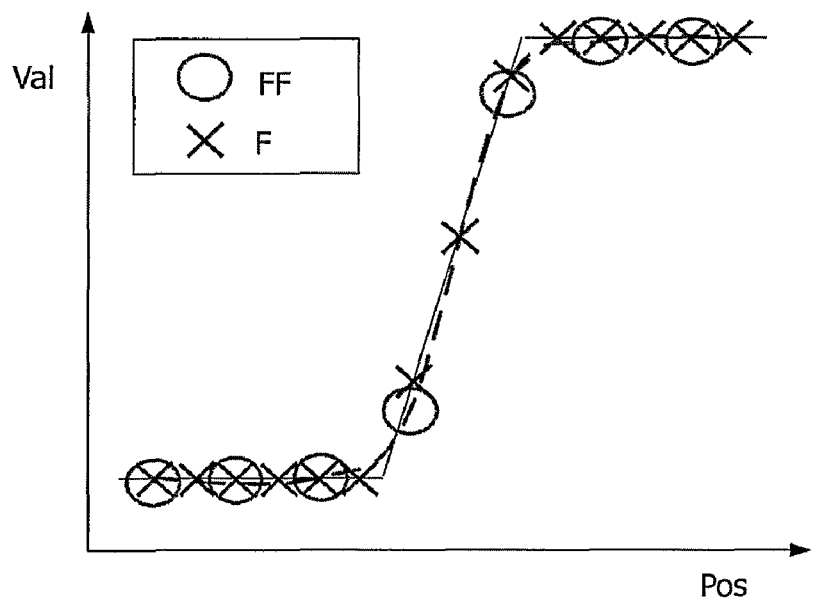
FIG. 3 illustrates the result of a down-sampling method in accordance with the invention on a set of pixels surrounding an edge.

The result of the down-sampling method is illustrated in FIG. 3 showing the evolution of the original and filtered data values val as a function of their position pos within a picture. In said FIG. 3, crosses represent the original data values F and circles represent the filtered data values FF. The dashed curve shows that transitions can be kept steep when modifying the calculation of the down-sampled values around the edges.

The down-sampling method has been described in only one direction. Nevertheless, it will be apparent to a person skilled in the art that the down-sampling method can be applied in the horizontal direction or in the vertical direction or in both directions.

The present invention also relates to device for down-sampling data values, said device implementing the down-sampling method by means of hardware comprising several distinct conventional elements, or by means of a suitably programmed processor. Said down-sampling device comprises:

- means for determining a first set of data values comprising an original current data value and values of original data spatially surrounding said current data;
- means for creating a second set of data values based on the first set by clipping an original data value of the first set when a difference between the current data value and said original data value is higher than a threshold; and
- means for low pass filtering the current data value based on the second set of data values.

The proposed invention can be applied to any video encoding or decoding device where sequences have to be stored in memory. It is particularly interesting for reducing the size of the reference image memory without introducing a blurring effect to the output decoded image.

Figure 4:
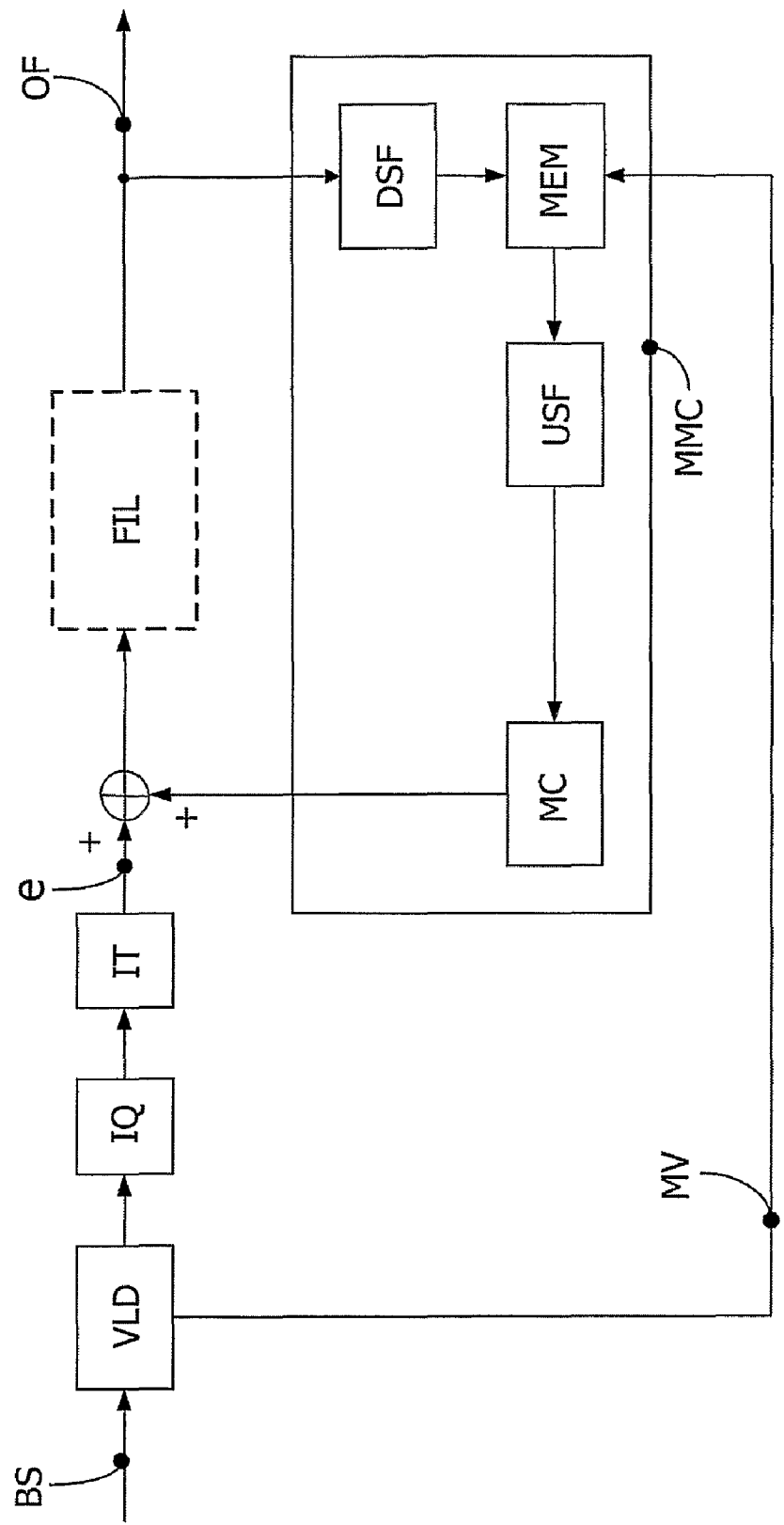
FIG. 4 shows an embodiment of a decoding device including a down-sampling device in accordance with the invention.

FIG. 4 shows an example of a decoding device according to the invention. Said decoding device comprises:

- a variable length decoding unit VLD suitable for decoding an encoded input data stream BS and for delivering decoded data, on the one hand, and decoded motion vectors MV to an image memory, on the other hand,
- an inverse quantizing unit IQ suitable for producing quantized data from the decoded data,
- an inverse frequency transform unit IT, for example an inverse discrete cosine transform block IDCT for producing inversely transformed data representing a residual error e from the quantized data.

The decoding device further includes an adder for adding motion-compensated data to the residual error, data-block-by-data block as this is already known to a person skilled in the art. The motion-compensated data are produced by a modified motion compensation unit MMC comprising in series a down-sampling device DSF, an image memory MEM, an up-sampling device USF and a motion compensation unit MC. The output of the adder is a data block of a decoded output image OF which is then delivered to a display (not represented) and which is also delivered to the down-sampling device DSF in accordance with the invention. The decoding device optionally comprises a deblocking filter FIL, said filter being for example the one proposed in the H.264 standard. It will be apparent to a person skilled in the art that the different units described here are conventional units in this technical field, except for the down-sampling unit.

The size of the reference frame memory can further be reduced by using a combination of the so-called embedded compression, said embedded compression comprising a conventional decoding/encoding chain, and the so-called embedded resizing, said embedded resizing comprising the down-sampling and up-sampling, as described before.

Figure 5:
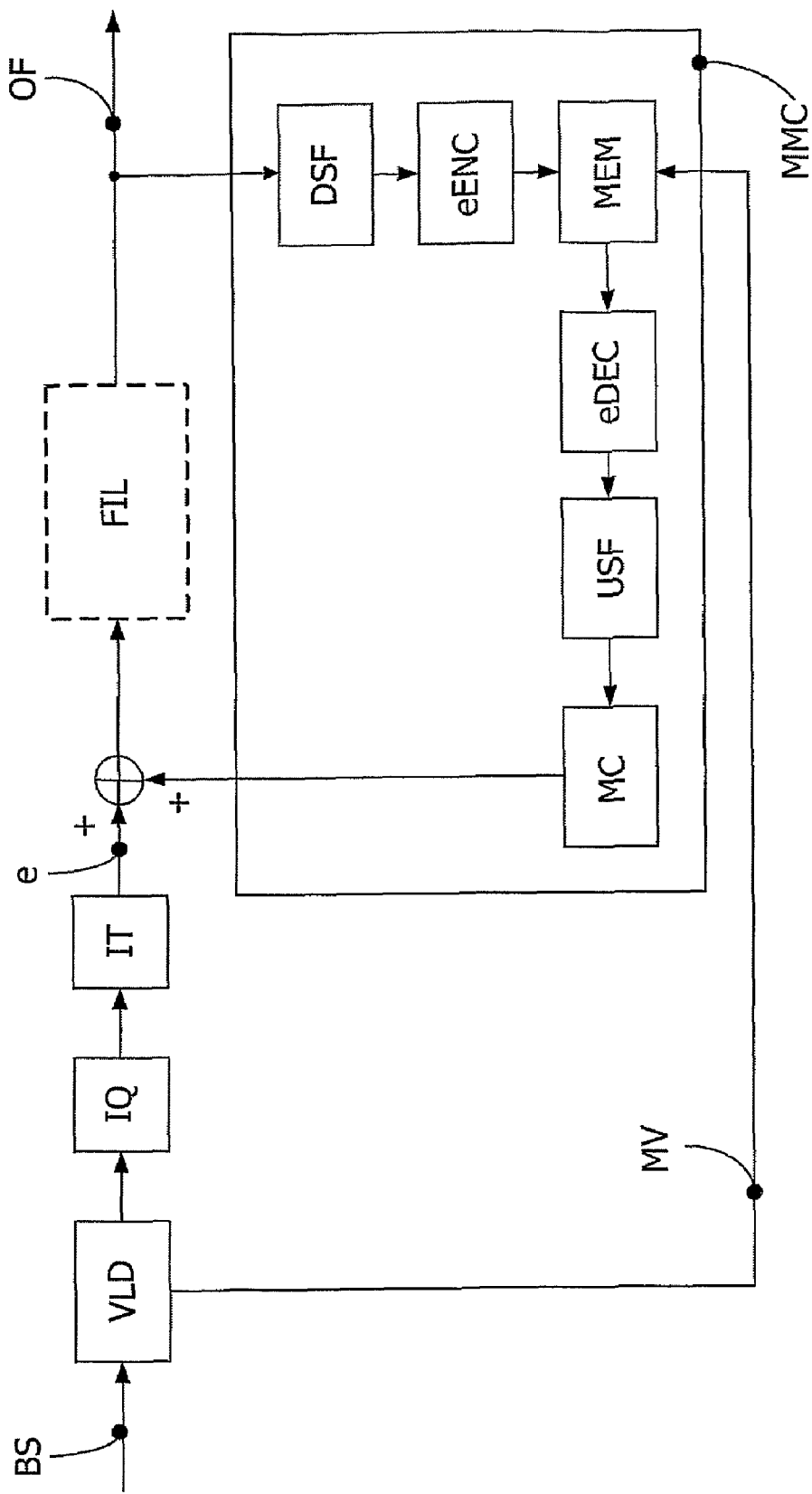
FIG. 5 shows another embodiment of a decoding device including a down-sampling device in accordance with the invention.

FIG. 5 shows an example of a decoding device, where the modified motion compensation unit MMC comprises in series the down-sampling device DSF in accordance with the invention, an embedded compression unit, an image memory MEM, an embedded decompression unit, an up-sampling device USF and a motion compensation unit MC. The embedded compression unit comprises for example a transform block T, a quantization block Q and a variable length coding block VLC in series. The embedded decompression unit comprises for example a variable length decoding block VLD, an inverse quantization block IQ and an inverse transform block IT blocks in series.

Figure 6:
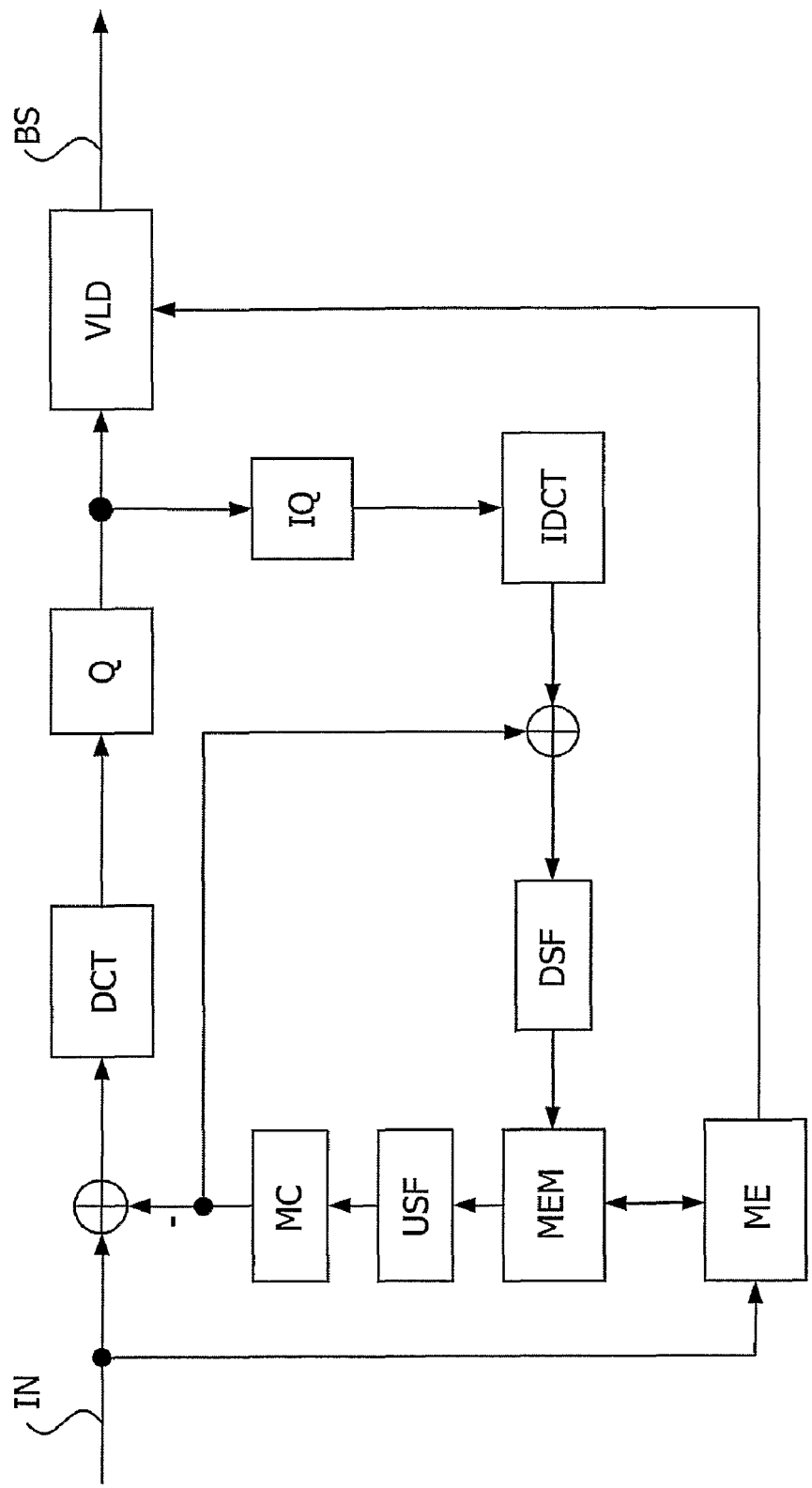
FIG. 6 shows an embodiment of a encoding device including a down-sampling device in accordance with the invention.

FIG. 6 shows an example of a video encoding device. Such an encoding device comprises a direct frequency transform block, for example a direct discrete cosine transform DCT, suitable for transforming input video data IN into transformed data; a quantizing block Q suitable for producing quantized data from the transformed data; and a variable length coding block VLC suitable for producing coded data ES from the quantized data. It also comprises a prediction circuit comprising in series an inverse quantizing block IQ; an inverse frequency transform block IT, for example an inverse discrete cosine transform block IDCT; an adder for adding the data block coming from the inverse transform block IDCT and from a motion compensation unit MC; the down-sampling unit DSF in accordance with the invention; an image memory MEM suitable for storing the images used by the motion compensation unit MC and the motion vectors resulting from a motion estimation unit ME; an up-sampling unit USF; and a subtractor suitable for subtracting the data coming from the motion compensation unit MC from the input video data IN, the result of this subtractor being delivered to the transform block DCT.

The proposed invention can also be applied to any video encoding/decoding device where video sequences have to be resized so as to be transmitted through a transmission channel.

Figure 7:
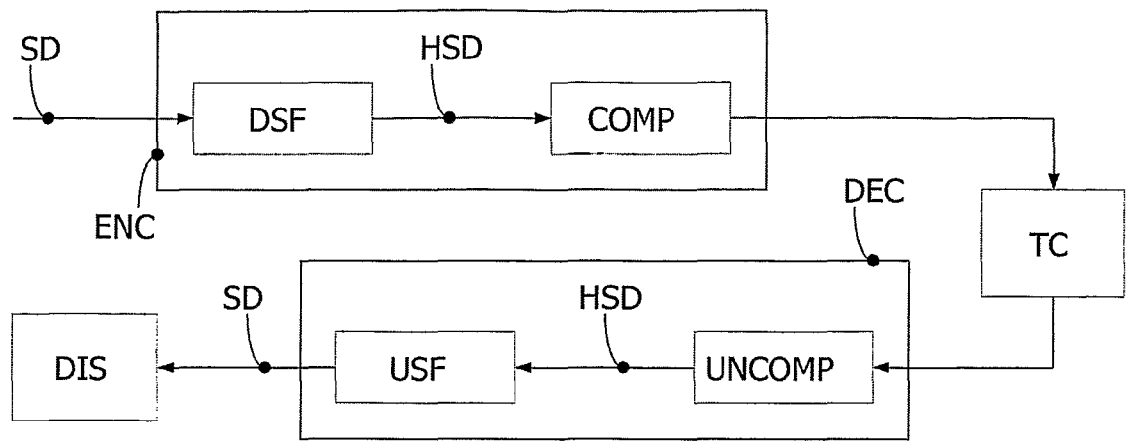
FIG. 7 shows a broadcast system including a down-sampling device in accordance with the invention.

Video sequences that are transmitted through a transmission channel TC (for instance, a broadcast or a mobile one) may be downsized to help the encoder fit in the required bandwidth, as shown in FIG. 7. At the input of the encoding device ENC, the video is, for example, at a standard definition SD. The encoding device ENC comprises a down-sampling filtering unit DSF in accordance with the invention for resizing the video at a reduced definition HSD and a conventional encoding unit COMP for producing a compressed video stream to be transmitted through the channel TC. At the receiving end, a decoding device DEC is adapted to uncompress the compressed video stream thanks to an conventional decoding unit UNCOMP and to up-sample the decoded frames so as to be displayed on a screen DIS at a final display resolution, thanks to an up-sampling filter unit USF.

The down-sampling method in accordance with the invention can also be considered as a simple compression method in storage applications.

Figure 8:
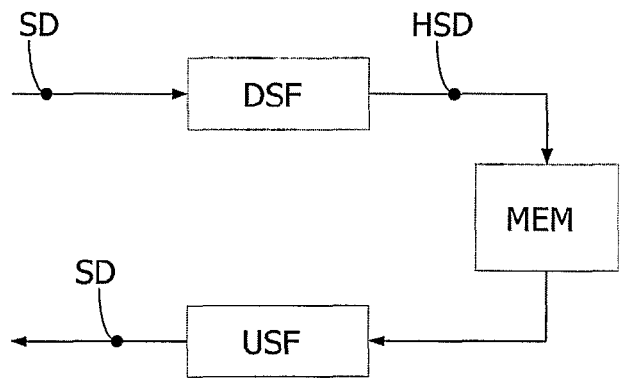
FIG. 8 shows a storage unit including a down-sampling device in accordance with the invention.

FIG. 8 shows a storage unit comprising in series the down-sampling unit DSF in accordance with the invention for resizing the video at a reduced definition HSD, a memory MEM adapted to store pictures at the reduced resolution and an up-sampling unit USF for resizing the video at the standard definition SD.

The down sampling method in accordance with the invention can also be utilized to adapt the source sequence to the capabilities of a display unit.

Figure 9:
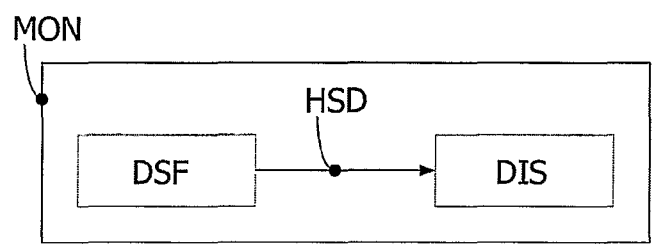
FIG. 9 shows a display unit including a down-sampling device in accordance with the invention.
}

FIG. 9 shows a display unit comprising in series the down-sampling unit DSF in accordance with the invention for resizing the video at a reduced definition HSD and a screen adapted to display a picture at the reduced definition.

Several embodiments of the present invention have been described above by way of examples only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. A method of down-sampling data values, said method comprising:
    determining a first set of data values comprising a central data value and peripheral values of original data spatially surrounding said central data value;
    comparing differences between the central data value and said peripheral values to a threshold;
    replacing a peripheral value corresponding to a difference that exceeds the threshold with a clipped value based upon the central data value, thereby producing a second set of data values but leaving the peripheral value unchanged when the difference is lower than the threshold; and
    low pass filtering the second set of data values.

2. A method as claimed in claim 1, further comprising:
    selecting the threshold as a trade-off between aliasing and blurring.

3. A device for down-sampling data values, said device comprising:
    means for determining a first set of data values comprising a central data value and peripheral values of original data surrounding said central data value;
    means for determining whether differences between the central data value and said peripheral values exceed a threshold;
    means for replacing a peripheral value corresponding to a difference that exceeds the threshold with a clipped value based upon the central data value, thereby producing a second set of data values but leaving the peripheral value unchanged when the difference is lower than the threshold, thereby producing a second set of data values; and means for low pass filtering the second set of data values.

4. The device of claim 3, further comprising:

a memory for storing the down-sampled data values; and a device for up-sampling the down-sampled data values stored in the memory.

5. The device of claim 4, further comprising:

a decoding unit for providing a residual error;

a motion compensation unit adapted to deliver motion compensated data values; and an adder for adding the residual error to the motion compensated data values, the output of said adder being provided to the input of the storage unit.

6. The device of claim 5, further comprising:

an embedded encoding unit between the device for down-sampling and the memory; and an embedded decoding unit between the memory and the device for up-sampling.

7. The device of claim 3, further comprising:

a screen for displaying the down-sampled data values.

8. The device of claim 3, further comprising:

a video encoder that uses the low pass filtered data values.

9. The device of claim 3, further comprising:

a portable apparatus that uses the low pass filtered data values.

10. The device of claim 3, further comprising:

a computer processor that uses the low pass filtered data values.

\* \* \* \* \*